United States Patent Office 3,151,951
Patented Oct. 6, 1964

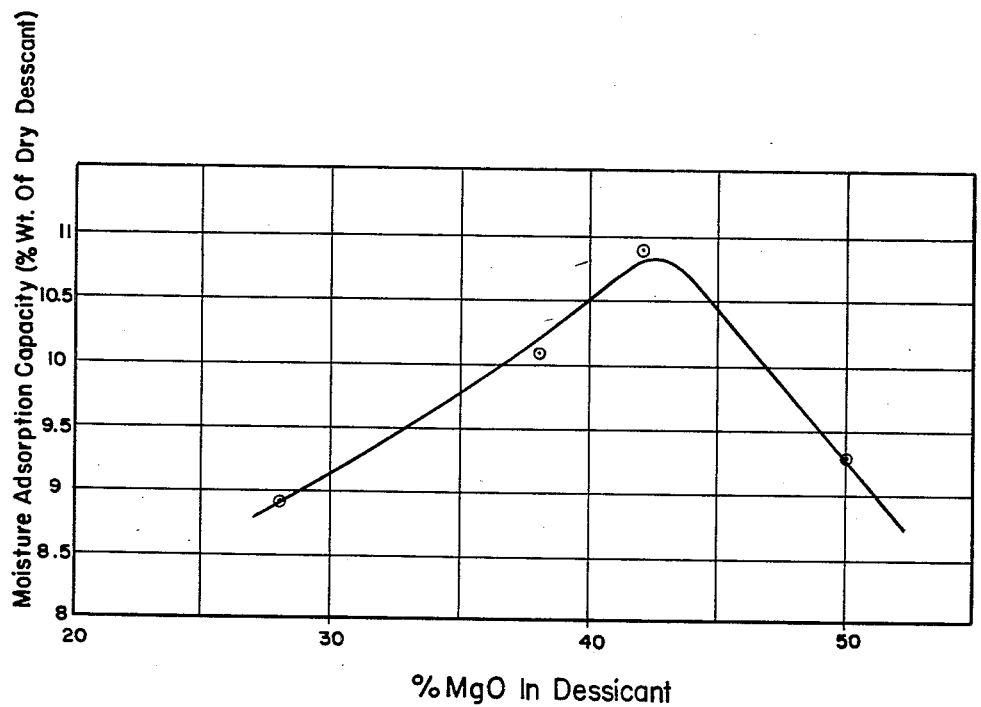

3,151,951
DRYING METHOD
Luther J. Reid, Jr., Woodbury, N.J., and Albert B. Schwartz, Philadelphia, Pa., assignors to Socony Mobil Oil Company, Inc., a corporation of New York
Filed May 23, 1960, Ser. No. 31,163
5 Claims. (Cl. 34—9)

This invention relates to an improved method for removing moisture from a wet material. More particularly, the present invention is concerned with the drying of a moisture-containing substance by contact with a solid desiccant consisting essentially of a silica-magnesia gel characterized by a magnesia content of 30 to 50 percent by weight, which content has been found to be a critical factor influencing the desiccating properties of said gel.

It has heretofore been known to remove water from moisture-containing materials by bringing the same into contact with solid desiccants such as silica gel, alumina gel, activated alumina, bauxite, etc. Many desiccants with varying affinities for water have been so used. Representative solid desiccants heretofore employed are shown below in the order of decreasing drying power as measured by static adsorption capacity in 10 percent relative humidity air determined in accordance with the Military Specification described in MIL-D-3716, dated March 17, 1952.

| Desiccant: | Adsorption capacity in 10% relative humidity air, percent |
|---|---|
| Silica gel | 7 |
| Alumina gel | 6 |
| Activated alumina | 3.5 |
| Activated bauxite | 2.5 |

Silica gel while not an effective desiccant above 160° F. may be effectively regenerated at 400° F. In general, the adsorption capacity in low relative humidity air, the adsorption capacity at high temperatures, the temperature required for regeneration and the thickness of the adsorption wave in dynamic dehumidification are related variables. The choice of desiccant for a particular application will accordingly be dependent on these properties.

It has been discovered, in accordance with the present invention, that a silica-magnesia gel characterized by a magnesia content within the range of 30 to 50 percent by weight affords an excellent desiccant having desiccating powers exceeding any of the aforementioned conventionally employed desiccants.

The silica-magnesia gel may be prepared in accordance with any of the methods well known in the art. Preferably, the silica-magnesia gel utilized herein is prepared by the method described in U.S. 2,796,409 to Albert B. Schwartz. Such method comprises mixing three separate streams of (1) an acid solution, (2) an alkali metal silicate solution, and (3) an aqueous suspension of calcined magnesia to yield an alkaline hydrosol having a pH in the range of 8 to 11, the minimum pH of such hydrosol being defined by the expression:

$$pH = \frac{6500 - t}{560}$$

where $t$ is the temperature of calcination of the magnesia in degrees Fahrenheit, said temperature of calcination being between 800 and 2000° F.; effecting gelation of the hydrosol; washing the resulting hydrogel and drying and calcining the same. The silica-magnesia gel may be made in the form of a mass which is subsequently broken up into granular particles or in the form of beads utilizing well-known techniques such as those described in U.S. 2,384,946. A bead form desiccant generally permits better diffusion of fluid through the desiccant mass and consequently better utilization of adsorptive capacity than granular desiccants.

It is contemplated that the silica-magnesia gel desiccant containing 30 to 50 percent weight magnesia utilized herein may be employed for removing moisture from a wide variety of moisture-containing materials, including wet solids, liquids and gases. In particular, the silica-magnesia desiccant is effective for drying fluids and especially moist gases, including by way of example, natural gas and humid air.

Drying is effected by bringing the moisture-containing material into contact with the silica-magnesia gel desiccant containing 30 to 50 weight percent magnesia at a temperature not exceeding about 200° F. The silicia-magnesia gel may be regenerated by maintaining at a temperature of approximately 400° F. for a sufficient period of time to remove adsorbed moisture.

The following illustrative and comparative data will serve to demonstrate the advantages of the invention:

*Example 1*

Two hundred and eight (208) grams of magnesium oxide powder which had been calcined for 12 hours at 1400° F. was slurried with 2240 grams of solution containing 45 percent by weight "N" brand sodium silicate. The slurry was cooled to 38° F. and gelled by mixing with 1210 ml. of cold 10 percent sulfuric acid solution. The resulting gel was broken into lumps and held at 160° F. for 36 hours. The heat treated gel was then covered with 0.7 percent magnesium sulfate solution which was drained and replaced with fresh solution every two hours for a total of 18 hours. The gel was then washed until free of magnesium sulfate. It was then dried at 250° F. The dried gel was then tempered at 400° F. The composition of the resulting desiccant was 42 percent magnesia (MgO) and 58 percent silica ($SiO_2$).

The static adsorption capacity of this desiccant and three other desiccants containing different percentages of magnesia, designated as Examples 2–4, were determined in accordance with the Military Specification described in MIL-D-3716, dated March 17, 1952. The results are shown below:

| Example | Percent MgO in Desiccant | Moisture Adsorption Capacity (percent Wt.) in Air of Various Relative Humidities | | |
|---|---|---|---|---|
| | | 10% RH | 20% RH | 40% RH |
| 2 | 28 | 8.9 | 12.5 | 20.4 |
| 3 | 38 | 10.1 | 16.2 | 25.1 |
| 1 | 42 | 10.9 | 15.9 | 24.4 |
| 4 | 50 | 9.3 | 13.2 | 19.6 |

The moisture adsorption capacity in 10 percent relative humidity air for silica-magnesia gels of varying magnesia content is shown graphically in the attached figure of the drawing. Referring more particularly to this figure, it will be seen that the silica-magnesia gel desiccants having a magnesia content of 30 to 50 percent by weight and more particularly 36 to 47 percent by weight afforded an unusual and enhanced capacity for moisture adsorption. It will also be seen from this figure that the maximum moisture adsorption capacity is found at a magnesia content of about 42 percent.

We claim:

1. A method for drying a free moisture-containing material, comprising contacting said material with a silica-magnesia gel consisting essentially of 30 to 50 percent by weight magnesia and remainder silica; at a temperature below about 200° F. to remove moisture from said material and to adsorb said moisture by said gel.

2. A method for drying a free moisture-containing material, comprising contacting said material with a silica-magnesia gel consisting essentially of 36 to 47 percent by weight magnesia and remainder silica; at a temperature below about 200° F. to remove moisture from said material and to adsorb said moisture by said gel.

3. A method for drying a free moisture-containing gas comprising contacting said gas with a silica-magnesia gel consisting essentially of 30 to 50 percent by weight magnesia and remainder silica; at a temperature below about 200° F. to remove moisture from said gas and to adsorb said moisture by said gel.

4. A method according to claim 3, wherein said gas is air.

5. A method for drying a free moisture-containing material, comprising contacting said material with a silica-magnesia gel consisting essentially of about 42 percent by weight magnesia and remainder silica; at a temperature below about 200° F. to remove moisture from said material and to adsorb said moisture by said gel.

References Cited in the file of this patent

UNITED STATES PATENTS

| | | |
|---|---|---|
| 715,366 | Gayley | Dec. 9, 1902 |
| 1,985,205 | Derr | Dec. 18, 1934 |
| 2,343,295 | Bailie et al. | Mar. 7, 1944 |
| 2,369,074 | Pitzer | Feb. 6, 1945 |
| 2,384,946 | Marisic | Sept. 18, 1945 |
| 2,470,410 | Nelson | Mar. 17, 1949 |
| 2,499,328 | Pawlansky | Feb. 28, 1950 |
| 2,530,129 | McAteer et al. | Nov. 14, 1950 |
| 2,699,430 | Teter | Jan. 11, 1955 |
| 2,782,869 | Gray | Feb. 26, 1957 |
| 2,790,512 | Dow | Apr. 30, 1957 |
| 2,796,409 | Schwartz | June 18, 1957 |
| 2,800,517 | Romanousky | July 23, 1957 |
| 2,935,465 | Plank | May 3, 1960 |
| 2,988,521 | Innes et al. | June 13, 1961 |
| 3,015,368 | Reid | Jan. 2, 1962 |